Figure 1:
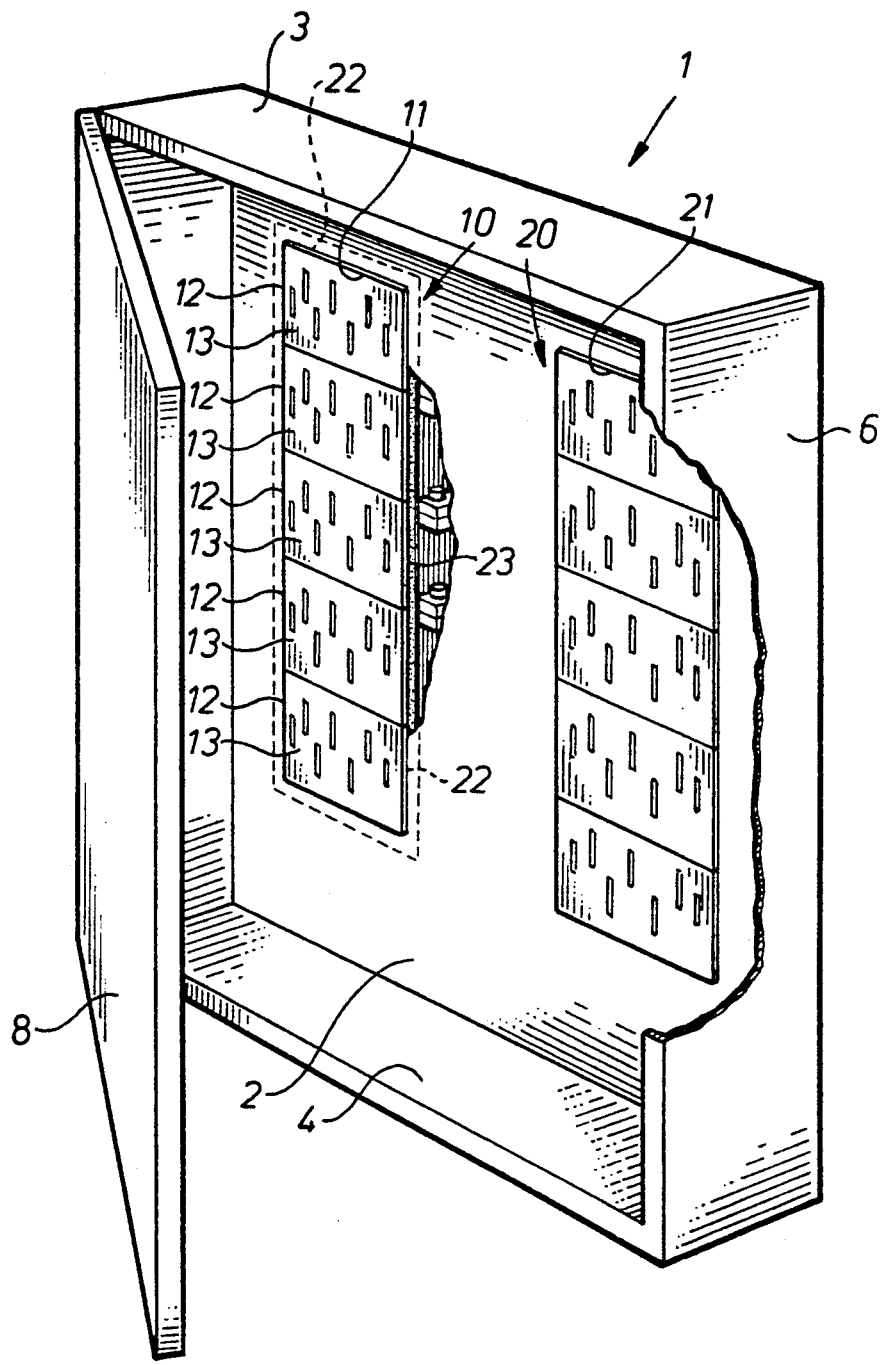

United States Patent [19]

Andersson et al.

[11] Patent Number: 5,238,017
[45] Date of Patent: Aug. 24, 1993

[54] VALVE CONNECTION ARRAY TO BE MOUNTED IN AN APPARATUS CABINET AND A METHOD OF MOUNTING SUCH AN ARRAY IN THE CABINET

[75] Inventors: Kjell Andersson, Grödinge; Kjell Somberg, Hägersten, both of Sweden

[73] Assignee: AB Mecman, Stockholm, Sweden

[21] Appl. No.: 852,216

[22] PCT Filed: Dec. 3, 1990

[86] PCT No.: PCT/SE90/00798
§ 371 Date: Jun. 2, 1992
§ 102(e) Date: Jun. 2, 1992

[87] PCT Pub. No.: WO91/10089
PCT Pub. Date: Jul. 11, 1991

[30] Foreign Application Priority Data

Dec. 22, 1989 [SE] Sweden ................. 8904357

[51] Int. Cl.[5] .............. F16L 55/18; E03B 11/00
[52] U.S. Cl. .................. 137/15; 137/271; 137/360; 251/367
[58] Field of Search .......... 137/271, 360, 15, 315; 251/367

[56] References Cited

U.S. PATENT DOCUMENTS

| | | | |
|---|---|---|---|
| 3,504,704 | 4/1970 | Beckett et al. | 251/367 |
| 3,654,960 | 4/1972 | Kierman | 137/271 |
| 3,698,432 | 10/1972 | Kutz | 137/271 |
| 3,707,989 | 1/1973 | Jullien-Davin | 137/271 |
| 3,974,856 | 8/1976 | Lancier | 137/271 |
| 4,032,821 | 6/1977 | Keiser | 137/360 |
| 4,483,365 | 11/1984 | Fallon | 137/271 |
| 4,768,559 | 9/1988 | Hehl | 251/367 |
| 4,815,496 | 3/1989 | Nishitani et al. | 137/271 |

FOREIGN PATENT DOCUMENTS

| | | |
|---|---|---|
| 1425586 | 11/1968 | Fed. Rep. of Germany . |
| 320558 | 2/1970 | Sweden . |
| 320239 | 3/1970 | Sweden . |

Primary Examiner—A. Michael Chambers
Attorney, Agent, or Firm—Townsend and Townsend

[57] ABSTRACT

A valve connection array for mounting at a cabinet wall in a sealed cabinet for disposing a plurality of valve connection blocks in at least one row is disclosed. Each valve connection block includes a valve connection portion on a front surface for individually connecting a valve and associated connections ports on a rear surface for connecting pressurized medium conduits. At least one row of valve connection blocks define between opposite side surfaces thereof at least one inlet port and at least one outlet port for providing common inlet and outlet ports between juxtaposed valve connection blocks. The blocks include means for mounting the blocks in said row with said sides sealingly juxtaposed for defining said common inlet and outlet ports between blocks and with said blocks defining a common flat surface area substantially in the form of a rectangle around said row. The row of blocks is mounted into a cabinet in a rectangular opening in the cabinet wall to dispose the valve connection portions inside the cabinet and said connection ports outside the cabinet, with the rectangular flat surface area sealingly engaging an edge portion of said cabinet wall defining the opening. First and second end members are mounted to the block array for closing the common inlet and outlet ports of said valve connection block array.

6 Claims, 2 Drawing Sheets

VALVE CONNECTION ARRAY TO BE MOUNTED IN AN APPARATUS CABINET AND A METHOD OF MOUNTING SUCH AN ARRAY IN THE CABINET

The invention relates to a valve connection array of the kind mounted in a cabinet wall in a seal apparatus cabinet. This type of array includes a plurality of valve connection blocks arranged in a row which, on the front face have holed, flat connection portions for individually connecting valves. On the rear face, these blocks have connection ports or nipples for connecting a pressurized medium conduit associated with a respective valve. This array is intended to be mounted at a wall in a sealed apparatus cabinet.

Such known valve connection arrays are usually mounted inside the cabinet with the front of the array easily accessible for fitting desired valves, while the pressurized medium conduits (pipes or hoses), connecting to nipples at the back of the array, are taken through individual leads-through in the rear cabinet wall (the front cabinet wall is normally a door).

In cases where the requirement for a sealed structure is great, e.g. in dairies, where apparatus cabinets of this kind must also withstand being sluiced with water, each individual lead-through must be arranged carefully, with individual holes in the rear cabinet wall directly opposite the associated connection nipple and a seal between the conduit and the edge of the hole. This kind of mounting will therefore be time-consuming and expensive.

The object of the invention is to simplify the mounting of valve connection arrays in sealed apparatus cabinets so that mounting and possible alternations can be carried out substantially more quickly and to a lower cost.

This object is achieved with a valve connection array which has the characterizing features to be mounted at a cabinet wall in a sealed cabinet. The array includes a plurality of valve connection blocks arranged in a row. These blocks have on a front face, holed flat connection portions for individually connecting a valve. On the rear face, the blocks have connection ports, or nipples, for connecting a pressurized medium conduit associated with a mounted valve. Typically, these conduits are located outside of the sealed apparatus conduit.

The main idea in accordance with the invention is thus to make a single large opening in the cabinet wall and to mount the array substantially in the plane of the cabinet wall, so that valves can be connected on the inside and pressurized medium conduits on the outside. This is enabled by the array being formed with a flat surface area extending substantially rectangularly round the holed connection portions to which the valves are fitted. The array can then be mounted from the outside (normally the back) of the cabinet, the surface area round the valve connection portions being positioned against the exterior edge area at the cabinet wall opening. Necessary sealing can easily be achieved using a sealing strip or a bead of sealing composition.

Thus, only one opening needs to be sealed in connection with mounting, although this opening is larger. In addition to this, the valve connection blocks lying in a row must of course be properly mutually sealed. This can be achieved with the aid of a flat sealing gasket. In addition, the array can be removably mounted against the apparatus wall.

The invention also relates to a method of mounting a valve connection array in an apparatus cabinet.

Figure 2:
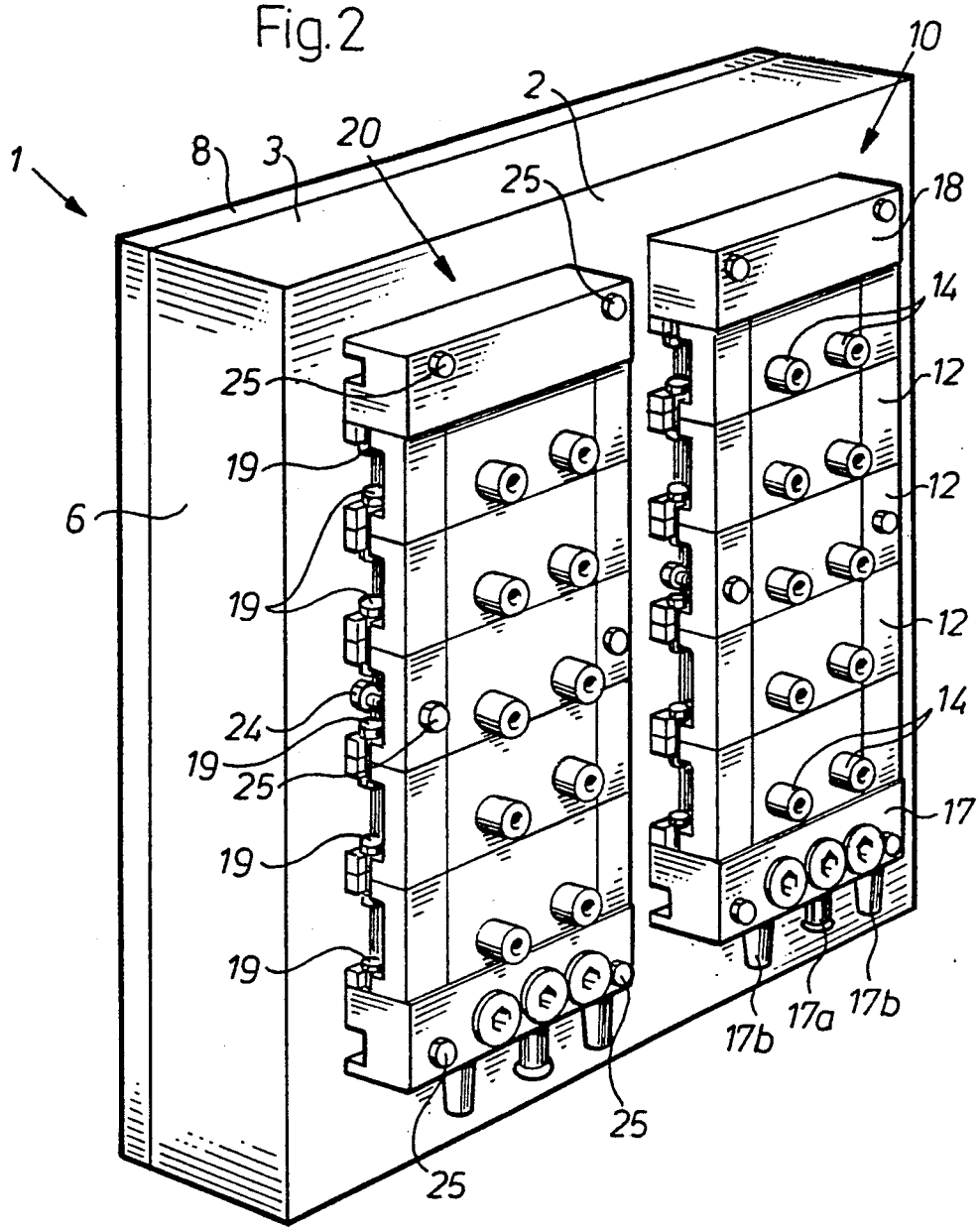
Figure 3:
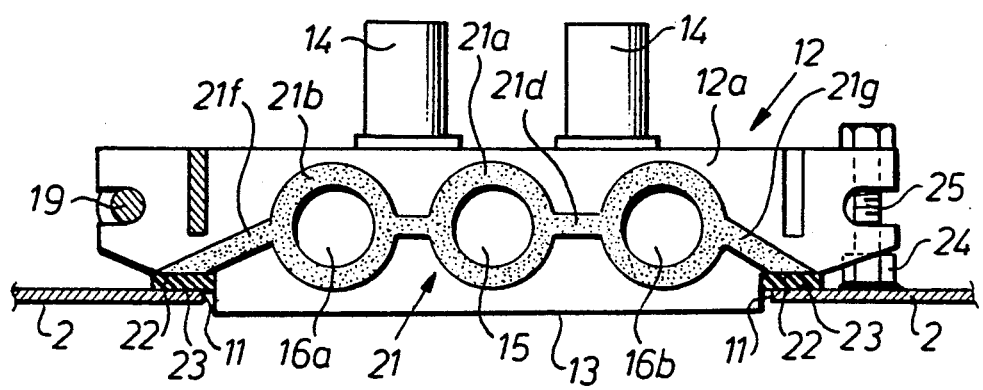

The invention will now be described in more detail with reference to the accompanying drawings, where FIG. 1 is an apparatus cabinet seen in perspective from the front, with the front door open to make visible valve connection arrays in accordance with the invention;

FIG. 2 is a perspective view of the apparatus cabinet (with closed door) seen from the rear with the rear of two valve arrays visible, and FIG. 3 is a view of the side or interface against an adjacent connection block of one of the connection blocks.

The apparatus cabinet illustrated in FIGS. 1 and 2 comprises tightly joined walls, namely a rear vertical wall 2, upper and lower walls 3 and 4 and side walls 5, 6 as well as a front door 8, which is carried on unillustrated hinges and which in a closed position seals the cabinet with the aid of a sealing strip (unillustrated) round the front opening of the cabinet.

At the rear cabinet wall 2, there are two valve connection arrays 10, 20 mounted such that the valves can be connected from the inside of the cabinet, while associated pressurized medium conduits (unillustrated) can be connected externally at the back of the cabinet. The valve connection arrays 10, 20 are tightly sealed per se and are mounted in a sealed state in the individual rectangular openings 11 and 20 at the rear cabinet wall 2, the entire apparatus cabinet 1 (with closed door 8) thus being dust-proof and can be sluiced with water, which is a requirement in certain surroundings, e.g. in diaries where all equipment must be kept clean the whole time. Electric cables (unillustrated) associated with the cabinet can be laid in the usual manner through conventional, sealed leads-through, e.g. of the so called PG-connection type.

The valve connection array 10 (the array 20 is the same, in the illustrated examples) is built up from a row of valve connection blocks 12 arranged side by side, which have a flat connection portion 13 on the front face with standardized holes for the connection of (unillustrated) valves, and which on their rear faces have connection nipples 14 for the connection of pressurized medium conduits (unillustrated) to the operating cylinders etc., which are to be controlled by the valves. In the illustrated example, the valve connection blocks are intended for pressure-controlled or electrically controlled 5-port, 2- or 3-position valves in accordance with ISO-standards, each connection block 12 having on its rear face seven connection ports (only two of which are drawn in), namely inlet, outlet, outlet and control ports, only the two outlet ports being utilized in this example (for pressure control, the control ports are also utilized). Remaining ports are plugged.

Common inlet ports 15 and outlet ports 16a, 16b are arranged in the flat side surfaces 12a (FIG. 3) of the respective valve block 12, these ports 15, 16a, 16b mutually communicating throughout the entire array 10 and communicating with a connection member 17 arranged at one end of the array, this member being provided with a common inlet connection 17a for supplying pressurized medium to the array, there also being two outlets 17b provided with silencers. At the opposite end of the array there is an end member 18 arranged such that the common ports 15, 16a, 16b are closed at this end (the upper end in FIG. 2).

All connection blocks 12, the connection member 17 and the end member 18 are tightly sealed side by side and are held together as a compact unit with the aid of screws 19, which clamp together projecting flanges of the adjacent blocks. There is thus obtained the necessary sealing of the mutually engaging side surfaces 12a of adjacent connection blocks with the aid of flat gasket members 21, having annular portions 21a, 21b, 21c round the respective common connection port 15, 16a, 16b, these annular portions connecting intermediate portions 21d, 21e, as well as laterally outwardly connecting outer portions 21f, 21g, which extend to a front flat surface portion extending on the respective side of the flat front connection portion 13 of the connection block 12.

In accordance with the invention, the connection blocks 12 included in the respective array have on their front faces a common, flat strip-like surface area 22 extending round the entire array in a continuos, substantially rectangular configuration, the long sides being formed by the above mentioned flat surface portions on either side of the flat connection portion 13 of the respective connection block 12, and the short sides being formed by the front or upper side of the connection member 17 and the end member 18, respectively. The respective connection portion 13 projects forward a distance from this flat, sealed strip-like surface area 22, i.e. inwardly in the apparatus cabinet 1 (compare FIGS. 1 and 3), after mounting the array.

For mounting the valve connection arrays 10 and 20, the mentioned rectangular openings 11 and 21 are made in the rear cabinet wall 2, and the arrays 10 and 20 are inserted from behind in its respective opening 11, 21, so that the surface area 22 comes into engagement against the exterior edge area round the opening. Before final assembly a sealing strip 23, or a corresponding bead of sealing compound, has been applied along the entire surface area 22, thus ensuring satisfactory sealing action along the edges of the openings 11, 21. The flat, hole connection portions 13 project out sufficiently from the surface area 22 so that, after mounting in the position illustrated in figures, they are located internally in relation to the interior surface of the apparatus cabinet wall 2. In this way, standard valves of different makes can be connected to the connection portions 13 and any such portions 13, which may possibly not be utilized, are covered with blanks (unillustrated).

On the back of the rear cabinet wall 2 (see FIG. 2) there are a plurality of nuts 24 being permanently attached, e.g. by welding, along the edge area against which the surface area 22 engages with the intermediary of the sealing strip 23, and for removable fixing of the valve connection arrays 10, 20 to the rear cabinet wall 2 screws 25 are taken through holes in laterally projecting flanges on the back of the connection blocks 12, the connection member 17 and the end member 18 and are securely engaged with the threads of the fixed nuts 24.

It will be understood that the described arrangement is completely sealed by way of the effective sealing round the openings 11, 21, between the adjacent connection blocks 12 (by the gaskets 21, which extend continuously between the sealing strips 23) and the dense material in the respective connection block.

We claim:

1. A process for mounting a valve connection array at a cabinet wall for disposing a plurality of valve connection blocks in at least one row, each said valve connection block including flat connections portions on a front surface for individually connecting a valve and connection ports for connecting a pressurized medium conduit on a rear surface thereof associated with a valve connected to said ports on said front surface, said valve connection array comprising in combination:

providing valve connection blocks having said flat connection portions on a front surface for mounting a valve and connections ports on a rear surface for receiving pressurized media from said valve, said blocks defining between opposite side surfaces thereof at least one inlet port and at least one outlet port for providing between juxtaposed said valve connection blocks at said side surfaces common inlet and outlet ports between juxtaposed valve connection blocks;

juxtaposing said blocks in said array with said sides juxtaposed for defining said common inlet and outlet ports between blocks and disposing said flat connections portions on said front surface in a co-planar array;

mounting said array in a rectangular opening in said cabinet to dispose said front surface of said blocks to receive valves at flat connection portions on one side of said rectangular opening and said connection ports within said cabinet on the other side of said rectangular opening with said rectangular flat surface area sealingly engaging an edge portion of said rectangular opening.

2. A valve connection array for mounting at a cabinet wall in a sealed cabinet for disposing a plurality of valve connection blocks in at least one row, each said valve connection block including a valve connection portion on a front surface for individually connecting a valve and associated connections ports on a rear surface for connecting pressurized medium conduits, said valve connection array comprising in combination:

said at least one row of valve connection blocks, said blocks defining between opposite side surfaces thereof at least one inlet port and at least one outlet port for providing common inlet and outlet ports between juxtaposed valve connection blocks;

means for mounting said blocks in said row with said sides sealingly juxtaposed for defining said common inlet and outlet ports between blocks and with said blocks defining a common flat surface area substantially in the form of a rectangle around said row;

means mounting said row of blocks in a rectangular opening in said cabinet wall to dispose said valve connection portions inside said cabinet and said connection ports outside said cabinet, wherein said rectangular flat surface area sealingly engaging an edge portion of said cabinet wall defining said opening.

3. A valve connection array for mounting at a cabinet wall according to claim 2 and including:

first and second end members mounted to said block array for closing said common inlet and outlet ports of said valve connection block array.

4. A valve connection array for mounting at a cabinet wall according to claim 2 and including:

gasket means disposed between said side walls of said mounting blocks.

5. A valve connection array for mounting at a cabinet wall according to claim 2 and wherein:

said means mounting said array is detachably removable from said cabinet.

6. A valve connection array for mounting at a cabinet wall according to claim 2 and wherein:

said means mounting said array includes screws and nuts mounted between paired said blocks.

* * * * *